United States Patent [19]

Wittmann

[11] 4,204,744
[45] May 27, 1980

[54] SWITCH FOR LIGHT CONDUCTING FIBERS

[75] Inventor: Julius Wittmann, Deisenhofen, Fed. Rep. of Germany

[73] Assignee: SiemensAktiengesellschaft, Berlin & Munich, Fed. Rep. of Germany

[21] Appl. No.: 872,162

[22] Filed: Jan. 25, 1978

[30] Foreign Application Priority Data

Feb. 7, 1977 [DE] Fed. Rep. of Germany ....... 2704984

[51] Int. Cl.² ............................................. G02B 5/14
[52] U.S. Cl. .................................................. 350/96.20
[58] Field of Search ..................................... 350/96.20

[56] References Cited

U.S. PATENT DOCUMENTS

| 4,023,887 | 5/1977 | Speers | 350/96.20 |
| 4,152,043 | 5/1979 | Albanese | 350/96.20 |

FOREIGN PATENT DOCUMENTS 2,016,498 10/1971 Fed. Rep. of Germany ........ 350/96.20

OTHER PUBLICATIONS

P. G. Hale and R. Kompfner, "Mechanical Optical-Fibre Switch," Electronics Letter Jul. 22, 1976, vol. 12, No. 15 p. 388.

*Primary Examiner*—Rolf G. Hille
*Attorney, Agent, or Firm*—Hill, Van Santen, Steadman, Chiara & Simpson

[57] ABSTRACT

A switch for optically connecting a first light conducting fiber selectively with at least one second light conducting fiber characterized by a first light conducting fiber having a magnetic sleeve adjacent the free end thereof, at least one second light conducting fiber, a substrate having a first flat surface with a layer being disposed on the first flat surface and having a recess with a groove for each of the first and second fibers extending therefrom. Each of the second fibers is disposed in its respective groove with the free end extending into the recess and the first fiber is disposed in its groove with its free end which has the magnetic sleeve being mobile in the recess between a first position forming an optical connection with one of the second fibers and a second position out of optical connection with one of the second fibers so that an application of an external magnetic field causes the free end of the first fiber to move between the first and second positions. One of the preferred methods of forming the switch comprises providing a substrate having a layer of light sensitive material disposed thereon, exposing the light sensitive material through a mask of a desired configuration, developing the exposed light sensitive layer to produce the recess with the grooves extending therefrom so that the fibers are clamped in the grooves with their ends extending into the recess to form the switch.

9 Claims, 2 Drawing Figures

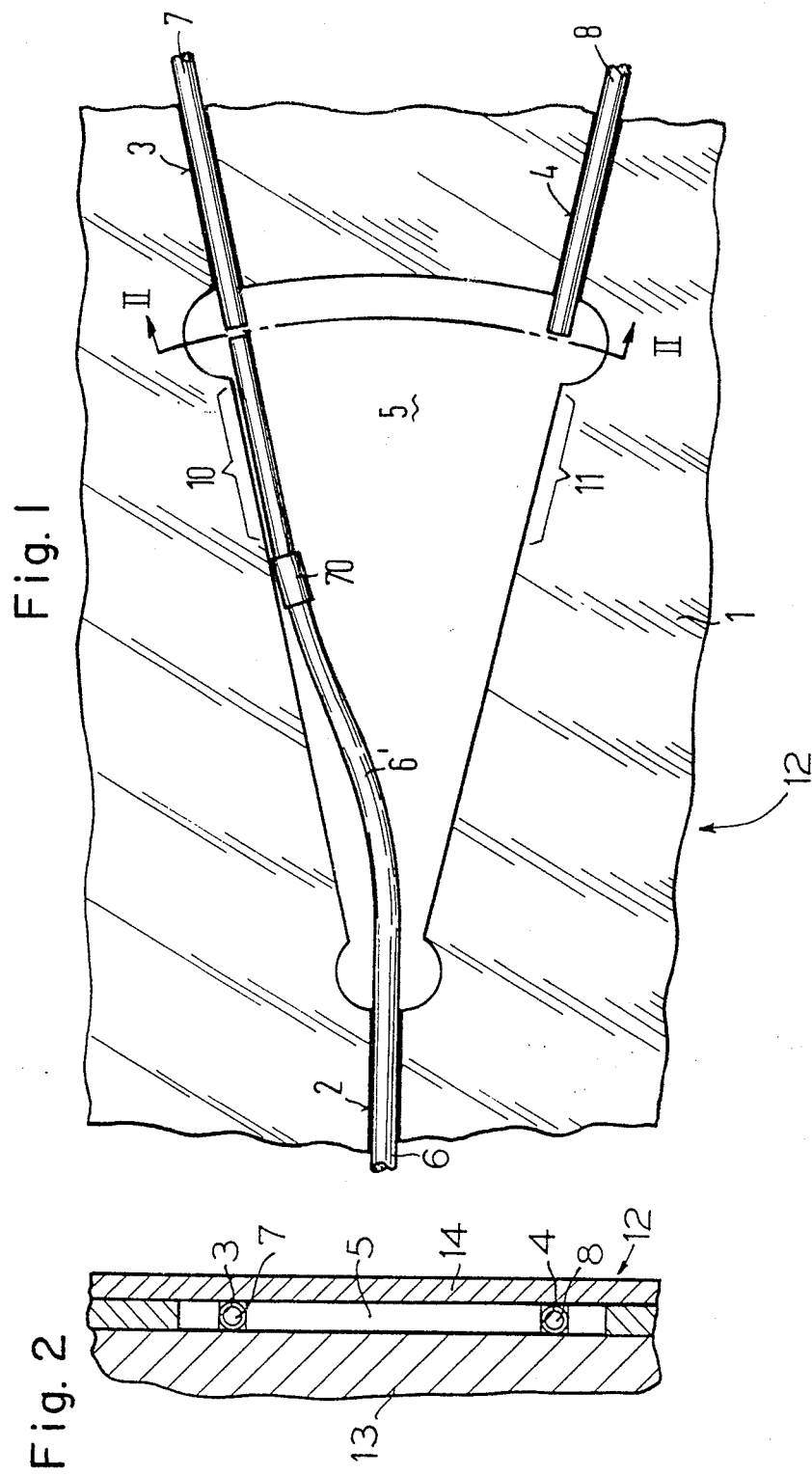

SWITCH FOR LIGHT CONDUCTING FIBERS

BACKGROUND OF THE INVENTION

1. Field of the Invention

The present invention relates to a switch for light conducting fibers.

2. Prior Art

In optical communication systems, the signals conducted in a light conducting fiber must be able to be influenced. This is effected, for example, with switches by means of which a light conducting fiber can be selectively, optically connected to various other light conducting fibers and enable different communication paths to be interconnected.

A switch of this type is disclosed, for example, in a publication by P. G. Hale, R. Kompfner, *Electronics Letters*, July 22, 1976, Vol. 12, No. 15, page 388. The switch disclosed in the article has a tube with a square cross sectional passage. The end of the first light conducting fiber is introduced into one end of the tube, and secured with an adhesive so that a free end of the light conducting fiber can be moved transversely within the tube. To enable movement of the free end of the first fiber, a nickel sleeve, which can be influenced by an externally produced magnetic field, is placed on the free end of the first light conducting fiber. The other end of the tube has two second light conducting fibers, which are secured in the tube by an adhesive with their free ends disposed at diagonally opposite corners of the square cross section of the passage. By transverse movement of the free end of the first light conducting fiber, the first light conducting fiber can be optically connected to a selected one of the two second light conducting fibers. To accomplish this, the end face of the first light conducting fiber is brought into a position directly opposite the end face of one of the second light conducting fibers.

Since the light conducting fibers of this switch are mounted or adhered to the tube by an adhesive, the switch is relatively difficult to produce. Furthermore, the switch has a relatively large thickness, which is undesirable in many applications.

SUMMARY OF THE INVENTION

The present invention is directed to providing a particular flat switch, which can be produced without the use of adhesives. To accomplish this aim, the switch of the present invention comprises a first light-conducting fiber having a magnetic sleeve adjacent the free end thereof, at least one second light conducting fiber, a substrate having a first flat surface, a layer disposed on the first flat surface, said layer having a recess with a groove for each of said first and second fibers extending therefrom, each of said second fibers being disposed in its respective groove with the free end extending into said recess and said first fiber being disposed in the groove with its free end having the magnetic sleeve being movable in the recess and being guided by the first flat surface of the substrate between a first position forming an optical connection with one of said second fibers and the second position out of optical connection with said one second fiber so that an application of a magnetic field from an external source will cause the free end of said first fiber to move between said first and second positions. The recess may be filled with an immersion liquid which will reduce the light loss at the connection and the recess may be covered or closed by a cover.

The layer which may be a metal layer having the recess and grooves formed therein either by depositing the layer on a mask, or by etching, can also be formed of a light sensitive material which was produced by exposing the material through a mask and developing it to form the recess and grooves.

A switch in accordance with the present invention possesses a substrate, which on a flat surface is provided with the layer-like zone having a groove into which the light conducting fibers can be clamped. The free end of the first light conducting fiber is arranged so as to be mobile within an adjusting space formed by the recess in the layer-like zone which adjusting space is delimited by stop means. Thus, the free end can be moved to a first position to form a straight line with one end of a second light conducting fiber with the end face of the free end of the first fiber being arranged opposite to the end face of the second fiber and the end faces virtually touching one another. The free end of the first light conducting fiber is provided with a magnetic sleeve so that the end can be moved under the influence of an externally applied magnetic field.

BRIEF DESCRIPTION OF THE DRAWINGS

FIG. 1 is a plan view of a switch in accordance with the present invention; and

FIG. 2 is a cross-sectional view taken along lines II—II of FIG. 1.

DESCRIPTION OF THE PREFERRED EMBODIMENTS

The principles of the present invention are particularly useful in an optical switch generally indicated at 12 in FIGS. 1 and 2.

The switch 12 has a layer 1, which is disposed on a substrate 13 (FIG. 2). In one embodiment, the layer is of a light sensitive material, such as a light sensitive synthetic foil, for example a photosensitive foil sold under the tradename RISTON by DuPont Chemical Company. The layer or foil 1 can be structured by being exposed to light through an appropriate mask and then developed. This layer or foil 1 possesses a plurality of grooves 2, 3 and 4 and an opening recess 5 which serves as an adjusting space.

A first light conducting fiber 6 is clamped in the first groove 2 with a free end 6' of the light conducting fiber being disposed in the adjusting space or recess 5 for movement therein. This adjusting space is delimited by stop means 10 and 11. The ends of two second light conducting fibers 7 and 8 are disposed and clamped in the grooves 3 and 4 with the free end disposed in the recess or space 5. When the free end 6' of the light conducting fiber 6, which free end has a sleeve 70 of magnetic material, is in contact with the stop means 10, the end 6' forms a straight line with the end of the second light conducting fiber 7. When the free end 6' of the first light conducting fiber 6 is in a position to contact or engage the other stop means 11, it forms a straight line with the end of the other second light conducting fiber 8. Thus, the first light conducting fiber 6 in each case can be optically connected to one or the other of the second light conducting fibers 7 and 8. The light loss, which occurs at the connection of the first and second fibers, is reduced in proportion to the reduction of the distance between the end faces of the first and second fibers while lying opposite one another and also by the reduction of the offset between the axes of the two fibers.

Advantageously, the switch can be produced extremely economically. First, a light sensitive layer such as a light sensitive foil 1 is applied on the flat surface of the substrate 13. This foil or layer 1 can be structured by subjecting it to a single exposure through an appropriately structured mask. Thus, the desired structure, for example, the grooves 2, 3 and 4 and the recess 5 which has the stop means 10 and 11, is formed during the subsequent development step. Then the light conducting fibers 6, 7 and 8 are introduced into the grooces 2, 3 and 4. Due to the elasticity of the material forming the layer 1, each of the fibers 6, 7 and 8 is clamped in a fixed position as it is inserted in its respective groove.

The switch can also be made utilizing galvanoplastic methods, etching methods, or a mixed form of these two methods.

With the galvanoplastic method, a synthetic covering or layer is applied, for example on a metallized layer of a substrate or on a metal substrate. This covering is structured in such a manner that only the areas where the grooves 2, 3 and 4 and the recess 5 are to be formed remain covered with the material. Such a structuring can be done by an exposure and development process of a light sensitive material. After structuring the layer, metal will be galvanically deposited on the substrate whereupon the synthetic material acts as a galvanic resistant mask to prevent depositing of the materials in the area of the grooves 2, 3 and 4 and the recess 5. Thus, when the synthetic material is removed, the deposited layer will have the desired structure of the grooves 2, 3 and 4 and the recess 5.

In an etching method, a metal substrate or a substrate having a metal layer is covered with an etch resistant material again preferably a photo resistant material such as a RISTON foil. After exposure and development, the remaining portions of the foil cover the metal surface but leave exposed portions which will have the configuration of the grooves 2, 3 and 4 and the recess 5. In a subsequent etching process, the adjusting space or recess 5 and the grooves 2, 3 and 4 are then etched into the metal layer or metal substrate.

While it is not necessary, the switch 12 can be provided with a cover 14 (FIG. 2) which will protect the switch from dust. The adjusting space 5 can also be filled with an immersion liquid, for example a transparent liquid which possesses the same index of refraction as the cores of the fibers 6, 7 and 8. As a result, virtually no reflection losses will occur at the transition of the light between the first and the second conducting fibers. In a case in which the aforementioned immersion liquid is provided, the cover also serves to prevent the immersion liquid from escaping. It should be noted that when the cover 14 is provided, the layer 1 will have a thickness slightly larger than the diameter of the sleeve 70 on the free end 6' of the first fiber 6.

The magnetic field required to move the free end 6' of the first light conducting fiber 6 can be produced, for example by coils or by a movable or mobile permanent magnet. In this case, it is expedient for the coils or permanent magnets to be arranged in such a manner that the free end 6' of the first light conducting fiber is pressed somewhat against the surface of the substrate 13. This ensures that the free end of the first light conducting fiber 6 cannot be lifted off of the substrate.

Thus, in this case, the substrate advantageously serves as a guide for the free end of the first light conducting fiber 6 and additional guide elements are superfluous.

Although various minor modifications may be suggested by those versed in the art, it should be understood that I wish to embody within the scope of the patent warranted hereon all such modifications as reasonably and properly come within the scope of my contribution to the art.

I claim:

1. A switch for optically connecting a first light conducting fiber selectively with at least one second light conducting fiber, said switch comprising a first light conducting fiber having a magnetic sleeve adjacent a free end thereof, at least one second light conducting fiber, a substrate having a first flat surface, a layer disposed on said first flat surface, said layer having a recess with a groove for each of said first and second fibers extending therefrom, each of said second fibers being disposed in their respective groove with the free end extending into said recess and said first fiber being disposed in its groove with its free end having the magnetic sleeve being mobile in said recess and being guided by said first flat surface between a first position forming an optical connection with at least one of said second fibers and a second position out of optical connection from said one second fiber so that an application of an external magnetic field causes said free end of said first fiber to move between said first and second positions.

2. A switch according to claim 1, which further includes a cover closing said recess.

3. A switch according to claim 1, wherein said recess is filled with an immersion liquid.

4. A switch according to claim 3, which includes a cover closing said recess.

5. A switch according to claim 1, wherein said layer consists of a metal.

6. A switch according to claim 1, wherein said layer consists of a synthetic material.

7. A switch according to claim 6, wherein the synthetic material consists of a light sensitive material.

8. A switch according to claim 1, wherein said recess has a stop surface engaged by the free end of said first fiber as it assumes the first position.

9. A method of forming a switch for optically connecting a first light conducting fiber selectively with at least one second light conducting fiber, said first fiber being disposed in a groove with a free end received in a recess and each of said second fibers being disposed in a groove with an end extending into the recess, said method comprising the steps of providing a substrate having a first flat surface, applying a light sensitive layer to said first flat surface of the substrate, providing a mask having a configuration corresponding to the configuration of the recess with grooves extending therefrom, exposing the light sensitive layer through said mask, developing the layer to form the recess having the grooves extending therefrom, and then clamping the first and second light conductors in their respective grooves with the free end of the first light conductor being movable in the recess and being guided by said first flat surface from a position optically connected to the end of at least one of said second light conductors to a position out of optical connection therewith.

* * * * *